(12) United States Patent
Bhole et al.

(10) Patent No.: US 11,162,053 B2
(45) Date of Patent: Nov. 2, 2021

(54) NONYLPHENOL ETHOXYLATE-FREE OIL DISPERSANT FORMULATION

(71) Applicant: ECOLAB USA INC., St. Paul, MN (US)

(72) Inventors: Yogesh Bhole, Pune (IN); Manish Singh, Pune (IN); Jeremy Finison, Pine Hall, NC (US); Daniel Meier, Naperville, IL (US)

(73) Assignee: ECOLAB USA INC., St. Paul, MN (US)

( * ) Notice: Subject to any disclaimer, the term of this patent is extended or adjusted under 35 U.S.C. 154(b) by 48 days.

(21) Appl. No.: 16/002,789

(22) Filed: Jun. 7, 2018

(65) Prior Publication Data

US 2018/0355284 A1    Dec. 13, 2018

Related U.S. Application Data

(60) Provisional application No. 62/517,708, filed on Jun. 9, 2017.

(51) Int. Cl.

| | | |
|---|---|---|
| *C11D 3/20* | (2006.01) | |
| *C08L 71/02* | (2006.01) | |
| *C02F 5/10* | (2006.01) | |
| *C02F 1/68* | (2006.01) | |
| *C11D 3/48* | (2006.01) | |
| *C11D 3/37* | (2006.01) | |
| *C11D 1/72* | (2006.01) | |
| *C08G 65/00* | (2006.01) | |
| *C02F 103/02* | (2006.01) | |

(52) U.S. Cl.
CPC .............. *C11D 3/2068* (2013.01); *C02F 1/68* (2013.01); *C02F 5/10* (2013.01); *C08L 71/02* (2013.01); *C11D 1/72* (2013.01); *C11D 3/3707* (2013.01); *C11D 3/48* (2013.01); *C02F 2103/023* (2013.01); *C08G 65/00* (2013.01)

(58) Field of Classification Search
None
See application file for complete search history.

(56) References Cited

U.S. PATENT DOCUMENTS

| | | | |
|---|---|---|---|
| 3,793,218 | A | 2/1974 | Canevari |
| 3,996,134 | A | 12/1976 | Osborn et al. |
| 4,978,459 | A | 12/1990 | Bock et al. |
| 5,381,002 | A | 1/1995 | Morrow et al. |
| 5,585,341 | A | 12/1996 | Van Eenam |
| 5,770,549 | A | 6/1998 | Gross |
| 5,942,469 | A | 8/1999 | Juprasert et al. |
| 6,261,463 | B1 | 7/2001 | Jacob et al. |
| 6,767,881 | B1 | 7/2004 | Griese et al. |
| 6,846,793 | B1 | 1/2005 | Griese |
| 7,566,744 | B2 | 7/2009 | Newman et al. |
| 8,071,520 | B2 | 12/2011 | Hodge et al. |
| 8,658,584 | B2 | 2/2014 | Hodge et al. |
| 8,901,063 | B2 * | 12/2014 | Soontravanich .......... B08B 1/00 510/421 |
| 9,441,168 | B2 | 9/2016 | Soane et al. |
| 9,447,507 | B2 | 9/2016 | Hatch et al. |
| 2012/0122749 | A1 * | 5/2012 | McCormick ............. C11D 1/72 510/245 |
| 2013/0146545 | A1 | 6/2013 | Pabalan et al. |
| 2014/0110344 | A1 | 4/2014 | Hoag et al. |
| 2014/0206542 | A1 | 7/2014 | Moody et al. |
| 2015/0152329 | A1 * | 6/2015 | Seetharaman ........... C09K 8/54 422/16 |
| 2016/0017560 | A1 | 1/2016 | Takamura et al. |

FOREIGN PATENT DOCUMENTS

| | | | |
|---|---|---|---|
| WO | WO 2005/115603 | A2 | 12/2005 |
| WO | WO 2016/135154 | A1 | 9/2016 |

OTHER PUBLICATIONS

Atta, Ayman M. et al., "Application of New Modified Poly(ethylene Oxide)—Block-Poly(propylene oxide)—Block-Poly(ethylene oxide) Copolymers as Demulsifier for Petroleum Crude Oil Emulsion." Journal of Dispersion Science and Technology 33(6):775-785, 2012.
Lopes, Josias R. et al., "Investigation of Self-Assembly and Micelle Polarity for a Wide Range of Ethylene Oxide—Propylene Oxide—Ethylene Oxide Block Copolymers in Water." Langmuir, 14(4), pp. 750-756.

* cited by examiner

*Primary Examiner* — Clare M Perrin
(74) *Attorney, Agent, or Firm* — Eric D. Babych; Barnes & Thornburg LLP

(57) ABSTRACT

Nonylphenol ethoxylates (NPEs) have been used as surfactants in a wide variety of household products and industrial applications. Despite their effectiveness as surfactants, NPEs can accumulate in the environment and adversely affect aquatic organisms. The dispersants of the present disclosure can be used to disperse oil and/or microbes while avoiding the adverse effects of NPEs. Oil and microbial fouling is of particular concern in refinery cooling towers where the water may be contaminated with oil and microbial growth can cause cooling inefficiencies among other problems. The dispersant may include an oil dispersant comprising a $C_6$-$C_{20}$ alcohol ethoxylate, a bio-dispersant comprising a copolymer of ethylene oxide and propylene oxide, and 2-butoxyethanol. The oil dispersant, the bio-dispersant, and the 2-butoxyethanol form a dispersant solution, and the solution does not include a nonylphenol ethoxylate.

19 Claims, No Drawings

NONYLPHENOL ETHOXYLATE-FREE OIL DISPERSANT FORMULATION

BACKGROUND

1. Field of the Invention

The present disclosure generally relates to oil dispersion. More particularly, the disclosure pertains to a stable dispersant solution for dispersing oil.

2. Description of the Related Art

Nonylphenol ethoxylates (NPEs) have been used as surfactants in a wide variety of household products and industrial applications. Despite their effectiveness as surfactants, NPEs can accumulate in the environment and adversely affect aquatic organisms. NPEs degrade to nonylphenol (NP), which is a known endocrine disruptor and more environmentally persistent than NPEs.

Environmental Protection Agency has coordinated with manufacturers to eliminate the use of NPEs in household laundry detergents; however, NPEs are still widely used in industrial detergents. Under the Toxic Substances Control Act (TSCA), EPA proposed a Significant New Use Rule in September, 2014 requiring agency review before a manufacturer can use NP or NPEs.

NPEs have been used to prevent fouling due to hydrocarbons in industrial water systems. Fouling can occur even in industrial water systems treated with the best water treatment programs currently available. Fouling is the deposition of any organic or inorganic material on a surface.

If these industrial water systems are not periodically cleaned, then they will become heavily fouled. Fouling has a negative impact on the industrial water system. For example, organic fouling will buildup on the water contact surfaces and anywhere there is organic fouling, there is an ideal environment for the growth of microorganisms.

Evaporative cooling water systems are particularly prone to fouling. This fouling occurs by a variety of mechanisms including deposition of air-borne and water-borne and water-formed contaminants, water stagnation, process leaks, and other factors. If allowed to progress, the system can suffer from decreased operational efficiency, premature equipment failure, and increased health-related risks associated with microbial fouling.

Fouling can also occur due to microbiological contamination. Sources of microbial contamination in industrial water systems are numerous and may include, but are not limited to, air-borne contamination, water make-up, process leaks and improperly cleaned equipment. These microorganisms can establish microbial communities on any wetable or semi-wetable surface of the water system. Once these microbial populations are present in the bulk water more than 99% of the microbes present in the water will be present on all surfaces.

Exopolymeric substance secreted by microorganisms aid in the formation of biofilms as the microbial communities develop on the surface. These biofilms are complex ecosystems that establish a means for concentrating nutrients and offer protection for growth, and biofilms can accelerate scale, corrosion, and other fouling processes. Not only do biofilms contribute to reduction of system efficiencies, but they also provide an excellent environment for microbial proliferation that can include *Legionella* bacteria. It is therefore important that biofilms and other fouling processes be reduced to the greatest extent possible to minimize the health-related risk associated with *Legionella* and other water-borne pathogens.

BRIEF SUMMARY

In some embodiments, a dispersant is disclosed. The dispersant may include an oil dispersant comprising a $C_6$-$C_{20}$ alcohol ethoxylate, a bio-dispersant comprising a copolymer of ethylene oxide and propylene oxide, and 2-butoxyethanol. The oil dispersant, the bio-dispersant, and the 2-butoxyethanol form a dispersant solution, and the dispersant solution does not include a nonylphenol ethoxylate. In some embodiments, the dispersant solution consists of an oil dispersant, a bio-dispersant, and 2-butoxyethanol.

In some embodiments, a method of dispersing hydrocarbons and microbes is disclosed. The method may include adding a dispersant solution to process water used in a cooling tower. The dispersant solution may include an oil dispersant comprising a $C_6$-$C_{20}$ alcohol ethoxylate, a bio-dispersant comprising a copolymer of ethylene oxide and propylene oxide, and a solvent. The dispersant solution does not include a nonylphenol ethoxylate. In some embodiments, the dispersant solution consists of an oil dispersant, a bio-dispersant, and 2-butoxyethanol.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

DETAILED DESCRIPTION

Various embodiments are described below. The relationship and functioning of the various elements of the embodiments may better be understood by reference to the following detailed description. However, embodiments are not limited to those illustrated below. In certain instances details may have been omitted that are not necessary for an understanding of embodiments disclosed herein.

Dispersant formulations containing NPEs may be environmentally toxic and undesirably persistent. NPEs used in industrial applications can escape into the environment via discharged water that was exposed to the dispersant formulation. Biodegradable dispersants are needed that are more environmentally compatible. Some biodegradable dispersants could replace NPEs; however, the biodegradable dispersants may not form a stable solution with the other components of the formulation. The present disclosure relates to environmentally friendly dispersants that form a stable solution.

The dispersants of the present disclosure can be used to disperse oil and/or microbes. Oil and microbial fouling is of particular concern in refinery cooling towers where the water may be contaminated with oil and microbial growth can cause cooling inefficiencies among other problems.

In some embodiments, a dispersant may include an oil dispersant, a bio-dispersant, and 2-butoxyethanol. The oil dispersant may include a $C_6$-$C_{20}$ alcohol ethoxylate, and the bio-dispersant may include a copolymer of ethylene oxide and propylene oxide. The oil dispersant, bio-dispersant, and 2-butoxyethanol may form a dispersant solution, and the dispersant solution does not include a nonylphenol ethoxylate.

For the purposes of this disclosure, "stable" describes solutions that do not phase separate or form a cloudy suspension within 24 hours at room temperature. Stable dispersant solutions have several advantages over dispersions or multi-phase compositions. Stable solutions can be precisely metered while being added into a process to effectively control the dose of the active components. Stable solutions more rapidly mix with the medium to which it is added ensuring contact with the oil or microbes in solution or in contact with the solution.

In some embodiments, the oil dispersant may be a $C_{12}$-$C_{16}$ alcohol polyethoxylate. In some embodiments, the oil dispersant may be a $C_{12}$-$C_{18}$ alcohol ethoxylate. In some embodiments, the oil dispersant may be a $C_{12}$-$C_{18}$ alcohol ethoxylate with 7 mol ethylene oxide. In some embodiments, the oil dispersant may be a $C_{12}$-$C_{18}$ alcohol ethoxylate with 6 mol ethylene oxide. In some embodiments, the oil dispersant may be a $C_{12}$-$C_{18}$ alcohol ethoxylate with 8 mol ethylene oxide. In some embodiments, the oil dispersant may be a $C_{12}$-$C_{18}$ alcohol ethoxylate with 9 mol ethylene oxide. In some embodiments, the oil dispersant may be a $C_{12}$-$C_{18}$ alcohol ethoxylate with 5 mol ethylene oxide.

In some embodiments, the oil dispersant may be a compound of formula (I)

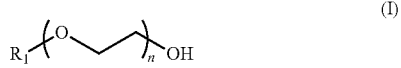
(I)

where $R_1$ may be an unsubstituted $C_6$-$C_{20}$ alkyl group, and n may be 1, 2, 3, 4, 5, 6, 7, 8, 9, 10, 11, 12, 13, 14, or 15. "Alkyl" refers to a linear or branched hydrocarbon radical. In some embodiments, $R_1$ may be an unsubstituted $C_8$-$C_{20}$ alkyl group. In some embodiments, $R_1$ may be an unsubstituted $C_{10}$-$C_{20}$ alkyl group. In some embodiments, $R_1$ may be an unsubstituted $C_{12}$-$C_{20}$ alkyl group. In some embodiments, $R_1$ may be an unsubstituted $C_{13}$-$C_{20}$ alkyl group. In some embodiments, $R_1$ may be an unsubstituted $C_{14}$-$C_{20}$ alkyl group. In some embodiments, $R_1$ may be an unsubstituted $C_{15}$-$C_{20}$ alkyl group. In some embodiments, $R_1$ may be an unsubstituted $C_{12}$-$C_{18}$ alkyl group.

In some embodiments, $R_1$ of formula (I) may be an unsubstituted $C_{12}$-$C_{18}$ alkyl group and n may be 5, 6, 7, 8, 9, or 10. In some embodiments, n may be 7. In some embodiments, n may be 6. In some embodiments, n may be 5. In some embodiments, n may be 8. In some embodiments, n may be 9. In some embodiments, n may be 10.

In some embodiments, the oil dispersant may be a $C_6$-$C_{20}$ alkyl having 1 to 15 polyalkylene oxide polymer substituents. In some embodiments, the $C_6$-$C_{20}$ alkyl may have 1, 2, 3, 4, 5, 6, 7, 8, 9, 10, 11, 12, 13, 14, or 15 polyalkylene oxide polymer substituents. In some embodiments, the polyalkylene oxide polymer may have an n of from about 1 to about 20. In some embodiments, the polyalkylene oxide polymer may have an n of from about 5 to about 10. In some embodiments, the polyalkylene oxide polymer may have an n of about 7.

In some embodiments, the oil dispersant may be a $C_6$-$C_{20}$ alkyl substituted with 1 to 6 groups of formula (II)

(II)

where n is 1, 2, 3, 4, 5, 6, 7, 8, 9, 10, 11, 12, 13, 14, or 15. In some embodiments, the oil dispersant may be a $C_8$-$C_{18}$ alkyl substituted with 1 to 6 groups of formula (II). In some embodiments, the oil dispersant may be a $C_{10}$-$C_{18}$ alkyl substituted with 1 to 6 groups of formula (II). In some embodiments, the oil dispersant may be a $C_{12}$-$C_{16}$ alkyl substituted with 1 to 6 groups of formula (II). The $C_8$-$C_{18}$ alkyl, $C_{10}$-$C_{18}$ alkyl, or $C_{12}$-$C_{16}$ alkyl may be substituted with 1, 2, 3, 4, 5, or 6 groups of formula (II).

In some embodiments, the oil-dispersant solution may include a nonionic surfactant. Nonionic surfactants include, but are not limited to, alkanolamides, alkyl polyglycocides, and the like, or combinations thereof. Such nonionic surfactants include one or more polyalkylene oxide polymer as a portion of the surfactant molecule. Examples of nonionic surfactants include, without limitation, benzyl-, methyl-, ethyl-, propyl-, butyl- and other like alkyl-capped polyethylene glycol ethers of fatty alcohols, and the like, or combinations thereof; polyalkylene oxide free nonionics such as, without limitation, alkyl polyglycosides, and the like, or combinations thereof; sorbitan esters, sucrose esters, sorbitan esters ethoxylates, sucrose ester ethoxylates, and the like, or combinations thereof; alkoxylated ethylene diamine; alcohol alkoxylates such as, without limitation, alcohol ethoxylates (SURFONIC® L12-6 commercially available from Huntsman), alcohol ethoxylate propoxylates, alcohol propoxylates, alcohol propoxylate ethoxylate propoxylates, alcohol ethoxylate butoxylates, and the like, or combinations thereof; polyoxyethylene glycol ethers, and the like, or combinations thereof; amine oxides, and the like, or combinations thereof; carboxylic acid esters such as, without limitation, glycerol esters, polyoxyethylene esters, ethoxylated and glycol esters of fatty acids, and the like, or combinations thereof; carboxylic amides such as, without limitation, diethanolamine condensates, monoalkanolamine condensates, polyoxyethylene fatty acid amides, and the like, or combinations thereof; and polyalkylene oxide block copolymers including an ethylene oxide/propylene oxide block copolymer such as those commercially available under the trademark PLURONIC® (BASF), and the like, or combinations thereof; other like nonionic compounds; or combinations thereof.

In some embodiments, the dispersant solution may include from about 20% to about 80% by weight of the oil dispersant. In some embodiments, the amount of oil dispersant in the dispersant solution may be from about 20% to about 60% by weight, about 30% to about 60% by weight, about 40% to about 60% by weight, or about 40% to about 55% by weight. In some embodiments, the amount of oil dispersant in the dispersant solution may be about 45% by weight. In some embodiments, the amount of oil dispersant in the dispersant solution may be about 50% by weight.

A representative bio-dispersant may be the commercially marketed NALCO® 7348, a nonionic ethylene oxide/propylene oxide (EO/PO) block copolymer.

In some embodiments, the dispersant may include a solvent. In some embodiments, the solvent may be water.

Solvents may include lower alkanols, lower alkyl ethers, glycols, aryl glycol ethers and lower alkyl glycol ethers. Examples of useful solvents include methanol, ethanol, propanol, isopropanol and butanol, isobutanol, ethylene glycol, diethylene glycol, triethylene glycol, propylene glycol, dipropylene glycol, mixed ethylene-propylene glycol ethers, ethylene glycol phenyl ether, and propylene glycol phenyl ether. Substantially water soluble glycol ether solvents include propylene glycol methyl ether, propylene glycol propyl ether, dipropylene glycol methyl ether, tripropylene glycol methyl ether, ethylene glycol butyl ether, diethylene glycol methyl ether, diethylene glycol butyl ether, ethylene glycol dimethyl ether, ethylene glycol propyl ether, diethylene glycol ethyl ether, triethylene glycol methyl ether, triethylene glycol ethyl ether, triethylene glycol butyl ether, and others. "Substantially water soluble" solvents are defined as being infinitely or 100% soluble by weight in water at 25 degrees C. "Substantially water insoluble" glycol ether solvents include propylene glycol butyl ether, dipropylene glycol butyl ether, dipropylene glycol propyl ether, tripropylene glycol butyl ether, dipropylene glycol dimethyl ether, propylene glycol phenyl ether, ethylene glycol hexyl ether, diethylene glycol hexyl ether, ethylene glycol phenyl ether, diethylene glycol phenyl ether, and others.

In some embodiments, the dispersant solution may include from about 20% to about 80% by weight of the bio-dispersant. In some embodiments, the amount of bio-dispersant in the dispersant solution may be from about 20% to about 60% by weight, about 20% to about 50% by weight, about 30% to about 60% by weight, about 35% to about 55% by weight, about 5% to about 30% by weight, about 10% to about 30% by weight, or about 20% to about 30% by weight. In some embodiments, the amount of bio-dispersant in the dispersant solution may be about 45% by weight. In some embodiments, the amount of bio-dispersant in the dispersant solution may be about 25% by weight.

In certain embodiments, the dispersant solution does not include diesters or diacids. In some embodiments, $C_5$-$C_{11}$, $C_7$-$C_{12}$, or $C_6$-$C_{13}$ alcohol ethoxylates may be excluded from the dispersant solution and are not added to the process water. Other compounds that may be excluded from the dispersant solution may include alkyd resins or the condensation products of polybasic acids and polyhydric alcohols. The condensation product of a monobasic acid and a polyhydric alcohol may also be excluded from the dispersant solution in some embodiments.

In other embodiments, a method of dispersing hydrocarbons and microbes is provided. The method may include adding a dispersant solution to process water used in a cooling tower. The dispersant solution may include an oil dispersant, a bio-dispersant and a solvent. The dispersant solution does not include a nonylphenol ethoxylate. The oil dispersant and the bio-dispersant may be as described above.

In some embodiments, the cooling tower may be a refinery cooling tower. Oil may accumulate or deposit on surfaces of the refinery cooling tower that are in contact with the process water. The dispersant solutions of the present disclosure are particularly effective at dispersing hydrocarbon that adheres to solid surfaces.

In some embodiments, the dispersant solution that is added to process water in the cooling tower may also include 2-butoxyethanol.

The amount of oil dispersant or bio-dispersant in the dispersant solution that is added to the process water in the cooling tower may be as described above. In some embodiments, an effective amount of oil dispersant and/or bio-dispersant may be added so that the desired anti-fouling effect is achieved.

In other embodiments, a method of cleaning filters. The method may include adding the dispersant solution comprising an oil dispersant, a bio-dispersant, and 2-butoxyethanol to the filter to remove contaminants. The filter may be a backwash filter used in a steel mill. In some embodiments, the method may include adding the dispersant solution to process water and then passing the process water through the filter.

EXAMPLES

Example 1

The neat dispersant T-Det A 267NR (CAS No. 68551-12-2), which is a $C_{12}$-$C_{16}$ poly(1-6) ethoxylate with 7 mol ethylene oxide was cloudy and underwent separation within about 24 hours at about room temperature. The neat dispersant Dehydol LT7 (CAS No. 68213-23-0), which is a $C_{12}$-$C_{18}$ with 7 mol ethylene oxide, also was cloudy and underwent phase separation within about 24 hours at about room temperature. T-Det A 267NR and Dehydol LT7 are commercially available compounds.

Dispersant formulations were prepared and four formulations formed stable solutions. The formulations shown in Table 1 were clear, free flowing, and stable (no phase separation) at about room temperature.

TABLE 1

Stable Dispersant Solutions

| Dispersant ID | Dispersant contents (% by weight) |
|---|---|
| 1 | 45% T-Det A267NR + 45% 7348* + 10% water |
| 2 | 50% Dehydol LT7 + 25% 7348 + 15% R-1171** + 10% water |
| 3 | 50% Dehydol LT7 + 15% R-1171 + 35% water |
| 4 | 35% T-Det A267NR + 50% water + 15% R-1171 |

*7348 is NALCO ® 7348, a nonionic ethylene oxide/propylene oxide (EO/PO) block copolymer
**R-1171 is 2-butoxyethanol Other dispersant formulations were prepared using different proportions of Dehydol LT7, NALCO® 7348, and 2-butoxyethanol. Table 2 shows that at different proportions or temperatures the formulation can phase separate or become cloudy and viscous.

TABLE 2

Dispersant Solutions

| Dispersant ID | Dispersant contents (% by weight) | Observations |
|---|---|---|
| 5 | 75% Dehydol LT7 + 10% water + 15% R-1171** | Formulation was clear at room temperature but phase separated at 4° C. |
| 6 | 50% Dehydol LT7 + 25% 7348 + 10% water | Slightly cloudy and viscous at room temperature |

*7348 is NALCO ® 7348, a nonionic ethylene oxide/propylene oxide (EO/PO) block copolymer
**R-1171 is 2-butoxyethanol Example 2

Oil dispersion performance was measured using stainless steel 316 metal plates (5 cm×12 cm) with 40 mg of gas oil coated on one side of the metal plate. The weight of the clean metal plate was recorded, $W_0$. The weight of the coated metal plate was recorded, $W_1$. The coated plate was immersed in a test solution for about 4 hours at about room temperature (22° C.). The plate was stirred at a fixed rpm of about 750 or 1250. At the end of 4 hours the plates were removed from the respective solutions and allowed to dry for about 30 minutes. The weight of the treated plate was recorded, $W_2$. The percentage of oil removal was calculated as $(W_1-W_2)*100/(W_1-W_0)$.

Table 3 shows the effectiveness of several compositions in removing oil from the metal plates. EO-PO refers to a block copolymer of ethylene oxide and propylene oxide.

TABLE 3

Oil dispersant performance of various surfactants and formulations

| Test ID | Composition | Application Dose (ppm) | % Oil removal @ 1250 rpm |
|---|---|---|---|
| 1 | 45% nonylphenol ethoxylate, 45% EO-PO block copolymer, 10% water | 200 | 90 |
| 2 | C12-C18 with 7 moles EO (Dehydol LT7) | 150 | >95 |
| 3 | C12-C16 poly(1-6) ethoxylate 7 moles EO (T-Det A267NR) | 150 | 94 |
| 4 | 45% T-Det A267NR, 45% EO-PO block copolymer, 10% water | 200 | 81 |
| 5 | 50% Dehydol LT7, 25% EO-PO block copolymer, 15% 2-butoxyethanol, 10% water | 300 | 83 |
| 6 | 50% Dehydol LT7, 15% 2-butoxyethanol, 35% water | 300 | N/A |
| 7 | 35% T-Det A267NR, 15% 2-butoxyethanol, 50% water | 300 | 80 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A dispersant, consisting of:
   about 20% to about 50% by weight of an oil dispersant;
   about 25% to about 60% by weight of a bio-dispersant, wherein the bio-dispersant is a copolymer of ethylene oxide and propylene oxide; and
   about 15% by weight of 2-butoxyethanol, and
   water,
   wherein the oil dispersant, the bio-dispersant, the water, and the 2-butoxyethanol form a dispersant solution, and the dispersant solution does not include a nonylphenol ethoxylate,
   wherein the oil dispersant is a compound of formula (I)

(I)

where $R_1$ is an unsubstituted linear $C_6$-$C_{20}$ alkyl group or an unsubstituted branched $C_6$-$C_{20}$ alkyl group, and n is 1, 2, 3, 4, 5, 6, 7, 8, 9, 10, 11, 12, 13, 14, or 15.

2. The dispersant of claim 1, wherein $R_1$ is an unsubstituted linear $C_{12}$-$C_{16}$ alkyl group.

3. The dispersant of claim 1, wherein $R_1$ is an unsubstituted linear $C_{12}$-$C_{18}$ alkyl group.

4. The dispersant of claim 1, wherein n is 7.

5. The dispersant of claim 1, wherein $R_1$ is an unsubstituted linear $C_{12}$-$C_{18}$ alkyl group and n is 5, 6, 7, 8, 9, or 10.

6. The dispersant of claim 1, wherein the dispersant solution comprises about 25% by weight of the bio-dispersant.

7. A method of dispersing hydrocarbons and microbes, comprising:
   adding a dispersant solution to water that is added to a cooling tower, the dispersant solution consisting of about 20% to about 50% by weight of an oil dispersant; about 25% to about 60% by weight of a bio-dispersant that is a copolymer of ethylene oxide and propylene oxide; a solvent; and about 15% by weight of 2-butoxyethanol, wherein the dispersant solution does not include a nonylphenol ethoxylate, and the solvent is water,
   wherein the oil dispersant is a compound of formula (I)

(I)

where $R_1$ is an unsubstituted linear $C_6$-$C_{20}$ alkyl group or an unsubstituted branched $C_6$-$C_{20}$ alkyl group, and n is 1, 2, 3, 4, 5, 6, 7, 8, 9, 10, 11, 12, 13, 14, or 15.

8. The method of claim 7, wherein the cooling tower is a refinery cooling tower.

9. The method of claim 7, wherein $R_1$ is an unsubstituted linear $C_6$-$C_{20}$ alkyl group.

10. The method of claim 7, wherein n is 7.

11. The method of claim 7, wherein $R_1$ is an unsubstituted linear $C_{12}$-$C_{18}$ alkyl group and n is 5, 6, 7, 8, 9, or 10.

12. A dispersant, consisting of:
   about 25% to about 35% by weight an oil dispersant;
   about 15% by weight of 2-butoxyethanol, and
   water,
   wherein the oil dispersant, the 2-butoxyethanol, and water form a dispersant solution, and the dispersant solution does not include a nonylphenol ethoxylate, wherein the oil dispersant is a compound of formula (I)

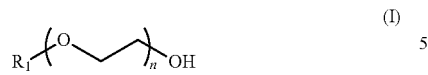
(I)

where $R_1$ is an unsubstituted linear $C_6$-$C_{20}$ alkyl group or an unsubstituted branched $C_6$-$C_{20}$ alkyl group, and n is 1, 2, 3, 4, 5, 6, 7, 8, 9, 10, 11, 12, 13, 14, or 15.

13. The dispersant of claim 12, wherein the solution is stable at about room temperature for at least 24 hours.

14. The dispersant of claim 12, wherein $R_1$ is an unsubstituted linear $C_{12}$-$C_{16}$ alkyl group.

15. The dispersant of claim 12, wherein $R_1$ is an unsubstituted linear $C_{12}$-$C_{18}$ alkyl group and n is 5, 6, 7, 8, 9, or 10.

16. The dispersant of claim 12, wherein n is 5, 6, 7, 8, 9, or 10.

17. The dispersant of claim 12, wherein n is 7.

18. The dispersant of claim 12, wherein $R_1$ is an unsubstituted linear $C_{10}$-$C_{20}$ alkyl group and n is 5, 6, 7, 8, 9, or 10.

19. A method of dispersing hydrocarbons and microbes, comprising: adding the dispersant solution of claim 12 to water that is added to a cooling tower.

* * * * *